Patented Dec. 7, 1926.

1,609,710

UNITED STATES PATENT OFFICE.

PHARAOH H. GILMORE, OF BOLINGER, ALABAMA.

COMPOSITION FOR THE TREATMENT OF SKIN AFFECTIONS.

No Drawing.   Application filed October 25, 1924. Serial No. 745,947.

This invention relates to a remedy for skin affections mainly for the removal of calli such as corns and the like.

The remedy comprises the following noted ingredients at substantially the proportions specified: wood alcohol, 1 quart; salicylic acid, one-half pound; camphor gum, 130 grains; tincture of iodine, 50 drops; extract of American hop hornbeam.

The various ingredients with the exception of the wood alcohol are thoroughly mixed and co-mingled first, and after such mixing are added to the wood alcohol. The whole composition is then thoroughly mixed.

The various ingredients used are of the conventional character which may be readily obtained with the exception of the American hop hornbeam bark extract. This is formed from the bark of the American hop hornbeam tree commonly called the iron wood tree. This bark is boiled down in water until a very strong extract is formed.

The remedy is for external use only. It is applied to the affected parts by either direct application, or by bandages containing the remedy. After several applications the corn or callus, may be easily removed.

The extract of American hop hornbeam bark is a very important ingredient in this remedy. It imparts to the composition certain astringent properties that thoroughly cleanse the affected parts and remove the danger of infection. I have found this ingredient is also of a healing nature. Due to the strength of the extract only a small proportion is necessary in the compounding of the remedy.

I claim:

A remedy of the character described comprising wood alcohol, salicylic acid, camphor gum, tincture of iodine and an extract of American hop hornbeam bark.

P. H. GILMORE.